Patented Nov. 11, 1930

1,781,473

UNITED STATES PATENT OFFICE

BRYNAR JAMES OWEN, OF OXFORD, ENGLAND, ASSIGNOR TO SUGAR BEET AND CROP DRIERS LIMITED, OF LONDON, ENGLAND, A CORPORATION OF ENGLAND

PROCESS FOR DEHYDRATING VEGETABLE SUBSTANCES AND PRODUCTS OF ORGANIC CHARACTER

No Drawing. Application filed November 27, 1926, Serial No. 151,253, and in Great Britain December 7, 1925.

The present invention relates to a process for dehydrating vegetable substances or products of organic character, which is more especially applicable in cases where such substances or products are massed or piled for treatment by means of an artificial drying agent or heat convector such as heated air.

It has been found that the artificial dehydration of a mass of vegetable matter, such as a living crop or plant, is governed in the main by the consolidation of the mass and that the rate of dehydration is to a large extent dependent upon the amount of consolidation which occurs and the rate at which the latter takes place. An investigation of the consolidation of such a mass of material has shown that consolidation varies from zero at the upper to a maximum at the lower portion of the mass, and produces therein a reaction which is dependent upon the conditions mainly as to pressure and temperature under which the heated air is supplied to and distributed within the said mass of material.

It has also been found that the artificial dehydration of a mass of material as aforesaid is appreciably affected by the animated character of the material, dependent upon its physiological condition and the natural means by which the crop or plant dies; and that certain effects due to natural causes are produced during the course of dehydration which are important factors in the successful treatment of the said mass of material, apart from the effect of artificial evaporation which is produced by the heated air.

The above said natural effects are produced by a number of physical or physiological reactions and of chemical reactions which occur within the mass of material. The said physical or physiological reactions include exudation and transpiration, besides the reaction due to consolidation as aforesaid. It has been found that exudation, or the expulsion from the material of moisture in a liquid state, varies directly with the amount of consolidation which takes place and the resulting pressure; and that transpiration, or the discharge from the living crop or plant of moisture in the form of vapour, varies directly with physical factors such as the rate of displacement of the heated air through the mass of material, the percentage humidity of the heated air on delivery to the material, and certain conditions of temperature.

The aforesaid chemical reactions include respiration, bacterial action, and chemical oxidation, and are in the nature of exothermic reactions resulting in the production of heat. It has been found that the amount of heat thus produced is dependent upon the following factors or conditions. Respiration, or the liberation of energy by the living organism due to the combustion of carbohydrates, produces a certain heat of oxidation which is liberated until the crop or plant is heated to the temperature at which it dies. Bacterial action, due to the development of bacteria in the presence of moisture, produces an amount of heat of oxidation which increases materially when the stage is reached at which the bacillus coli organisms cease to function and the bacillus calefactor begins to develop. Chemical oxidation, due to the presence of water and the combination of carbon with oxygen, generates an amount of heat of oxidation which varies with the temperature at which the reaction takes place and which increases considerably as the said temperature rises.

A study of these natural reactions has shown that they take place within the mass of material in the hereinafter described manner, and that the effects of the said reactions are materially influenced by the conditions under which the heated air is supplied to the said mass of material. Owing to the fact that the heated air is usually introduced in and distributed from the centre of the mass of material, the latter is gradually heated concentrically, with the result that the central portions of the mass are rapidly raised to the temperature of the ingoing air and that some few hours elapse before the outer portions of the mass reach the said temperature. The artificial evaporation produced by the heated air thus takes place in a concentric zone which gradually extends towards the outer surface of the mass as the treatment progresses. The remaining cooler portions of the mass are in the meantime under the influence of the aforesaid chemical reactions which take place in separate concentric zones according to the varying conditions as to temperature and pressure prevailing around the zone of artificial evaporation, these further concentric zones being displaced outwardly and eliminated gradually as the zone of artificial evaporation extends as aforesaid and the surrounding mass is gradually heated to the various temperatures at which the said reactions respectively cease to occur. The heat of oxidation which is produced by the exothermic reactions as stated above thus assist in heating the mass of material to an extent which is mainly dependent upon the initial temperature of the ingoing air. This heat is applied, at least partially, to furnish latent heat of vaporization for the moisture evaporated.

The dehydrating process according to this invention consists essentially in controlling or regulating the consolidation of the mass of material under treatment and in promoting or accelerating the natural reactions occuring within the latter by supplying an artificial drying agent, such as heated air, to the said mass of material at ranges of temperature, pressure and volume which are determined or selected and co-ordinated so that the rate of dehydration is increased to the greatest possible extent and the effects of exothermic reactions are utilized to the best possible advantage.

The initial temperature of the supply of heated air should be of such a degree that the fullest possible benefits are derived from the moisture-extracting properties of heated air, which are considerably greater at higher than at lower temperatures, and from the heating effects of the exothermic reactions, which are increased and accelerated by utilizing air at higher temperatures. The advantage of employing a relatively high initial temperature will be apparent from the following considerations. As regards artificial evaporation, the quantity of moisture extracted by a given volume of air heated to 180 degrees Fahrenheit is approximately ten times greater than that which is removed at an initial temperature of 112 degrees Fahrenheit. With regard to the exothermic reactions, the amount of heat generated by chemical oxidation at a temperature of 200 degrees Fahrenheit is approximately fifteen times greater than that which is produced at 100 degrees Fahrenheit. Again, the amount of heat of oxidation due to bacterial action, which begins to occur at a temperature in the neighborhood of 104 degrees Fahrenheit, increases until the temperature is raised approximately to 124 degrees Fahrenheit, when the bacillus coli organisms cease to function, and increases still further above this latter temperature, due to the development of the bacillus calefactor, until a temperature in the region of 158 degrees Fahrenheit is reached, at which the bacillus calefactor ceases to function and above which chemical oxidation only takes place. Furthermore, the heat of oxidation due to respiration is liberated until the material reaches a temperature in the neighborhood of 120 degrees Fahrenheit, at which stage the crop or plant dies and respiration ceases. The supply of air, however, should not be raised, on the other hand, to a temperature which would cause any injurious or adverse effect upon the particular material under treatment or the ultimate product thereof.

The determination or selection of the most suitable ranges of temperature for the supply of air employed for treating materials of various descriptions is governed by the foregoing considerations. Thus, in the case of surface crops of nutritive character, such as hay for example, the desired effects would be produced by utilizing an initial temperature ranging from 160 to 200 degrees Fahrenheit, while in the case of grain liable to be injured by excessive heat, such as corn for instance, satisfactory results would be obtained by employing an initial temperature ranging from 130 to 155 degrees Fahrenheit. In the case, however, of certain root-crops and other products unlikely to be adversely affected by an excess of heat, the supply of air could be initially raised to higher ranges of temperature, say from 200 to 240 degrees Fahrenheit, according to the nature and character of the particular crops or products. Should an initial temperature substantially below the lower limits of the above-specified ranges be used, the moisture-extracting properties of the heated air would decrease out of all proportion, and the heating effects of the exothermic reactions would not be utilized to the best advantage.

By employing a supply of air initially heated to ranges of temperature as aforesaid, the occurrence of the various exothermic reactions within the mass of material in separate concentric zones as already explained is promoted or accelerated to the greatest possible extent; chemical oxidation occurring in the zone next to the inner zone of artificial evaporation and respiration taking place in the zone next to the outer surface of the mass of material, whilst bacterial action is developed in the zone between the said zones of chemical oxidation and of respiration, until the stages are successively reached, during the course of the process, at which the said exothermic reactions respectively cease to occur as hereinbefore stated.

The initial volume of heated air supplied to the mass of material depends upon the size of the latter and should be such that, for a material of maximum moisture content no precondensation takes place within the said mass for a range of temperature as aforesaid.

This means that the air must not become "saturated" with moisture within the mass of material, or that the vapor, leaving the material with the air, is slightly superheated. A volume of air ranging from 9000 to 12000 cubic feet per minute for a mass of material of 3500 to 4500 cubic feet content will be found suitable in most cases for the purposes in view. If the volume were comparatively smaller, precondensation due to excessive moisture would occur in the outer portions of the mass under treatment, and, furthermore, the effects of oxidation would not be utilized to the best advantage owing to the consequent decrease in the quantity of oxygen contained in the supply of air. If, on the other hand, the volume were comparatively larger and the temperature unduly lower, the effectiveness of the dehydration would be adversely affected.

The initial pressure under which the heated air is supplied should be such that the rate of consolidation of the mass of material is decreased as rapidly as possible and that the correct volume as aforesaid is delivered through the said mass under the variations taking place during the course of consolidation. The comparatively rapid settling of the mass of material during the early stage of the process when the material is being heated by the air causes at first a proportionate increase in the resistance which the said mass offers to the passage of the current of air therethrough; as the treatment progresses, however, and the drying of the material is being effected, the resistance of the mass of material diminishes with the consequent decrease in the rate of consolidation and increase in the removal of moisture taking place during the subsequent stages of the process. As the supply of air is usually drawn through the heating apparatus and forced through the mass of material by means of a fan driven by motive power, the changes of resistance due to consolidation as aforesaid will cause corresponding variations in the power required to drive the correct volume of heated air through the said mass and consequent variations in the volume and temperature of the supply of air. These variations of volume and temperature, which are only comparatively slight under normal conditions, can, however, be counteracted or rectified by utilizing a suitable original pressure, conveniently measured by water-gauge, which is not permitted to vary beyond certain pre-determined limits.

The initial pressure under which the supply of air is to be delivered depends also to some extent, apart from the foregoing considerations, on the moisture-content of the material, and should be greater in the case of relatively wet materials than in that of comparatively dry ones in proportion to the percentage of moisture-content present. Satisfactory results will be obtained in most cases, when a motor or engine of 12 to 20 horse-power is used for driving a fan of the simple impeller type, by utilizing an initial water-gauge pressure within a range of 1½ to 3 inches in the duct by way whereof the air is supplied to the mass of material. Should the aforesaid variations due to consolidation be such that the lower or the higher limit of the above range of water-gauge pressure be unduly exceeded, the power under which the fan is driven should be varied accordingly so as to maintain the pressure within the compass of the said range. In cases, however, where a motor or engine of higher horse-power is employed and where the heating apparatus is of a sufficiently large capacity, the water-gauge pressure could be increased to say 4 inches, but the volume should then be increased in a corresponding proportion.

If an initial pressure substantially smaller than that of the lower limit of the above-stated range were utilized, the consequent increase of consolidation would decrease the volume of air to an extent which would cause precondensation to occur; such an increase of consolidation would, moreover, retard the rate of displacement of the air through the mass of material and the rate of dehydration of the latter, and the whole process, which depends for its effectiveness upon the proper inter-relation of all these factors and conditions, would be unbalanced.

The effectiveness of the process is enhanced by employing a supply of air which is heated to a high absorptive coefficient and to a low percentage of humidity and which is delivered under conditions which ensure an equal distribution and a uniform penetration of the air throughout the mass of material.

I claim—

1. The process of dehydrating vegetable substances, which consists in continuously supplying an artificial drying agent to a mass of such vegetable substances in the proportion of 9000 to 12000 cubic feet per minute to a mass of material of 3500 to 4500 cubic feet content, said drying agent being delivered at an initial temperature ranging from 160 to 200 degrees Fahrenheit and under a water-gauge pressure within a range of 1½ to 3 inches.

2. The process of dehydrating vegetable substances, which consists in continuously passing through a relatively large stationary mass of the material throughout the duration of the process a gaseous, oxidizing heat convector at a temperature higher than the approximate temperature of 145 degrees Fahrenheit at which the exothermic reactions due to respiration and to bacterial and chemical oxidation fully develop but lower than the maximum temperature liable to be detrimental to the material, and in thereby promoting in successive zones within the said mass of material due to such exothermic reactions an active development of natural heat which goes to compensate for the loss of artificial heat occurring during the passage of the said drying agent through the material due to the absorption of moisture therefrom, the rate of supply of the gaseous convector being so coordinated with the mass of material present that the gas does not become saturated, but is discharged slightly superheated.

3. The process of dehydrating vegetable substances as claimed in claim 2, in which the pressure under which the artificial drying agent is supplied to the mass of material is maintained throughout the duration of the process within a range determined for the particular mass by the maximum pressure necessary to force the supply of drying agent through the material when in its original wet state and the minimum pressure sufficient to pass the said supply of drying agent through the material when in its final dry condition, and is gradually reduced from such maximum to such minimum as the drying progresses to counteract the variations taking place due to consolidation in the resistance of the said mass of material during the dehydration thereof.

4. That improvement in the method of drying vegetable material by pasing heated air of low relative humidity through a mass of such material, which consists in so coordinating the temperature pressure and rate of flow of the air with the mass of material that exothermic reactions will take place in the material and will furnish part of the latent heat of vaporization necessary for drying, and that the total heat available is sufficient to preclude recondensation within the mass of material, but insufficient to afford any substantial degree of superheat to the vapor discharging from the material.

In testimony whereof I have signed my name to this specification.

BRYNAR JAMES OWEN.